(12) United States Patent
Furlong et al.

(10) Patent No.: US 8,429,983 B2
(45) Date of Patent: Apr. 30, 2013

(54) INSERTION TYPE FLOW MEASURING DEVICE FOR MEASURING CHARACTERISTICS OF A FLOW WITHIN A PIPE

(75) Inventors: Edward Randall Furlong, Beverly, MA (US); Xiaolei Shirley Ao, Lexington, MA (US)

(73) Assignee: General Electric Company, Schenectady, NY (US)

( * ) Notice: Subject to any disclaimer, the term of this patent is extended or adjusted under 35 U.S.C. 154(b) by 337 days.

(21) Appl. No.: 12/868,823

(22) Filed: Aug. 26, 2010

(65) Prior Publication Data

US 2012/0048031 A1 Mar. 1, 2012

(51) Int. Cl.
*G01F 1/00* (2006.01)
(52) U.S. Cl.
USPC .......................................... 73/861; 73/861.63
(58) Field of Classification Search .................. None
See application file for complete search history.

(56) References Cited

U.S. PATENT DOCUMENTS

| 3,357,243 A | 12/1967 | Woodcock | |
| 3,745,824 A | 7/1973 | Mannherz et al. | |
| 4,005,604 A * | 2/1977 | Herzl | 73/861.24 |
| 4,074,571 A * | 2/1978 | Burgess | 73/861.24 |
| 4,112,757 A * | 9/1978 | Hayward | 73/861.53 |
| 4,631,969 A * | 12/1986 | Schmoock | 73/861.12 |
| 5,632,632 A | 5/1997 | Huotari | |
| 6,581,475 B1 | 6/2003 | Hernoux et al. | |
| 7,237,440 B2 | 7/2007 | Gysling et al. | |
| 2003/0226405 A1* | 12/2003 | Bell | 73/861.52 |
| 2007/0214896 A1* | 9/2007 | Orleskie et al. | 73/861.66 |
| 2008/0060449 A1 | 3/2008 | Darsey | |

FOREIGN PATENT DOCUMENTS

| GB | 1117391 A | 6/1968 |
| GB | 2375401 A | 11/2002 |

OTHER PUBLICATIONS

Search Report and Written Opinion from corresponding EP Application No. 11178403.9-2204 dated Jan. 31, 2012.

* cited by examiner

*Primary Examiner* — Harshad R Patel
(74) *Attorney, Agent, or Firm* — Global Patent Operation; Mark A. Conklin

(57) ABSTRACT

A device for measuring the physical characteristics of a flow within a pipe is disclosed. In one exemplary embodiment, the device comprises a hollow ring having an outer wall fixably attached to a meter flange that is inserted between two sections of pipe, and an inner wall on which a sensor is mounted to facilitate accurate flow measurements.

17 Claims, 5 Drawing Sheets

INSERTION TYPE FLOW MEASURING DEVICE FOR MEASURING CHARACTERISTICS OF A FLOW WITHIN A PIPE

BACKGROUND OF THE INVENTION

The subject matter herein relates generally to insert flow meters, and, more particularly, to an improved insert flow meter capable of measuring the physical characteristics of a flow comprising more than one phase of matter, for example liquid and gas, also known as a multiphase flow meter.

Flow meters provide critical measurements concerning the characteristics of a flow within a pipe, for example the rate and volume of material flowing through the pipe, as well as pressure, temperature and other measurements. This is especially true in industrial applications, such as those in which a flowmeter is used to measure material flow in a chemical processing or petroleum refining plant. The data produced is used to not only monitor and quantify the plant output, but to evaluate overall plant conditions and operational performance. Insert meters placed within these industrial systems must therefore be robust in nature in order to function in the severe environments experienced in various plant applications, for example within widely varying temperature extremes, high flow rates, and high pressure, while producing highly accurate measurements in order to properly quantify production levels and assess operational characteristics.

Several devices are currently used to perform flow measurements in industrial applications. For example, in one solution, pressure sensors are placed along one or more cone-shaped plugs positioned in the center of a pipe. The plug occupies a portion of the pipe diameter through which the flow travels, thereby causing a disturbance in the flow as the material moves past. By measuring the differential pressures around the plug, the flow rate can be determined. The shape of the plug is chosen to enhance selected flow characteristics that cause the pressure differentials as the material flows past the contours of the plug. One limitation of this approach is that manipulating the flow using the plug can require a substantial length of straight pipe. This can create difficulties and increase costs in industrial applications, such as in a refinery, in which complicated networks of pipes and other equipment can limit the available space. In instances where the insert meter is retrofitted within an existing pipe network, retrofitting the system to accommodate a new meter can be time consuming and costly, especially in high pressure systems where the pipe wall can be very thick and made with expensive materials.

Other solutions employ an orifice plate having pressure sensors that extend into the flow within the pipe to create a partial blockage of the flow and measure pressure. Because insert meters employing plugs or orifice plates are placed within a pipe and, by design, work to reduce the area of the pipe to restrict flow in order to generate pressure differentials from which the flow rate is determined, such meters diminish the efficiency of the piping network. In turn, additional energy is required to transport the same amount of material as an unobstructed system would require, thereby increasing operational costs.

Furthermore, measurement accuracy can be dependent on positioning the plug or orifice plate in the center of the pipe, which can be difficult to correctly establish and maintain over time in industrial environments. Additionally, use of a centralized plug that restricts flow can result in build up of material and eventual clogging of the pipe over time, or, in extreme cases, rupture of the pipe and fittings. In high flow or high pressure environments, the suspended plug or orifice plate, or the components attached thereto, might break free and be carried along in the flow, causing damage to downstream components within the system.

Lastly, the technique of determining the flow rate from pressure differentials cannot distinguish between different phases of matter, for example liquid and gas. Many industrial applications often transport materials that comprise more than one phase of matter. Accordingly, in situations in which such a multiphase flow is present, for example as in a petroleum refinery where both liquid crude oil and natural gas may be present, insert flow meters are unable to determine the content of the flow and the volume of each component being transported within the pipe. Inaccurately determining the content of the flow can lead to problems in downstream systems that are dependent on the upstream flow calculations, and can also result in inaccurate valuations of the flow content, for example, in a situation where the crude oil being measured contains high natural gas content.

It would be advantageous to provide an insert flow meter that is not only mechanically robust and capable of being retrofitted into and operating in the limited space and severe environments experienced in industrial applications, but which also provides highly accurate measurements of flow characteristics, and which is capable of differentiating between the different phases of matter present in the flow.

BRIEF DESCRIPTION OF THE INVENTION

A device for measuring the characteristics of a flow within a pipe is disclosed, in one embodiment comprising a meter flange having a forward flange surface and a rearward flange surface, a central passage extending through the meter flange from the forward flange surface to the rearward flange surface, a ring having an inner wall and an outer wall, the outer wall being fixably attached to the meter flange, and the ring being substantially perpendicular to the forward flange surface, and a sensor located on the inner wall for measuring the characteristics of the flow.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which.

DETAILED DESCRIPTION OF THE INVENTION

Figure 1:
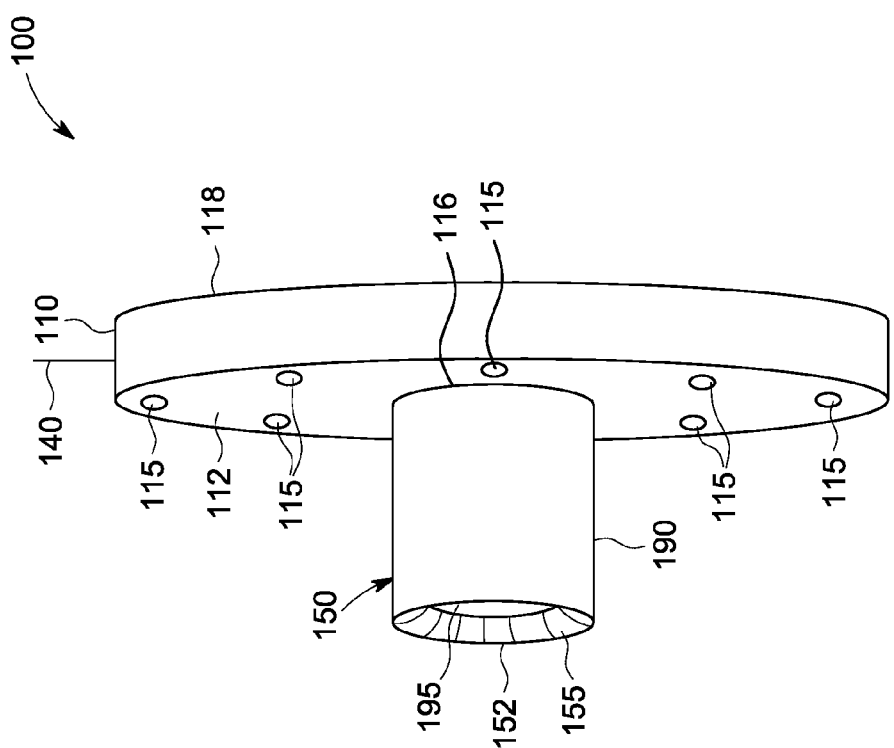
FIG. 1 is an exemplary perspective view of a multiphase insert meter in one embodiment of the invention.

FIG. 1 shows an exemplary perspective view of a multiphase insert meter 100 in one embodiment. In one exemplary embodiment, multiphase insert meter 100 can comprise a ring 150 attached to a meter flange 110. The ring 150 can be cylindrically shaped, having an outer wall 190 and an inner wall 195, and can be sized such that the ring 150 fits snugly within the inner diameter of the pipe within which the multiphase insert meter 100 is to measure flow.

Figure 2:
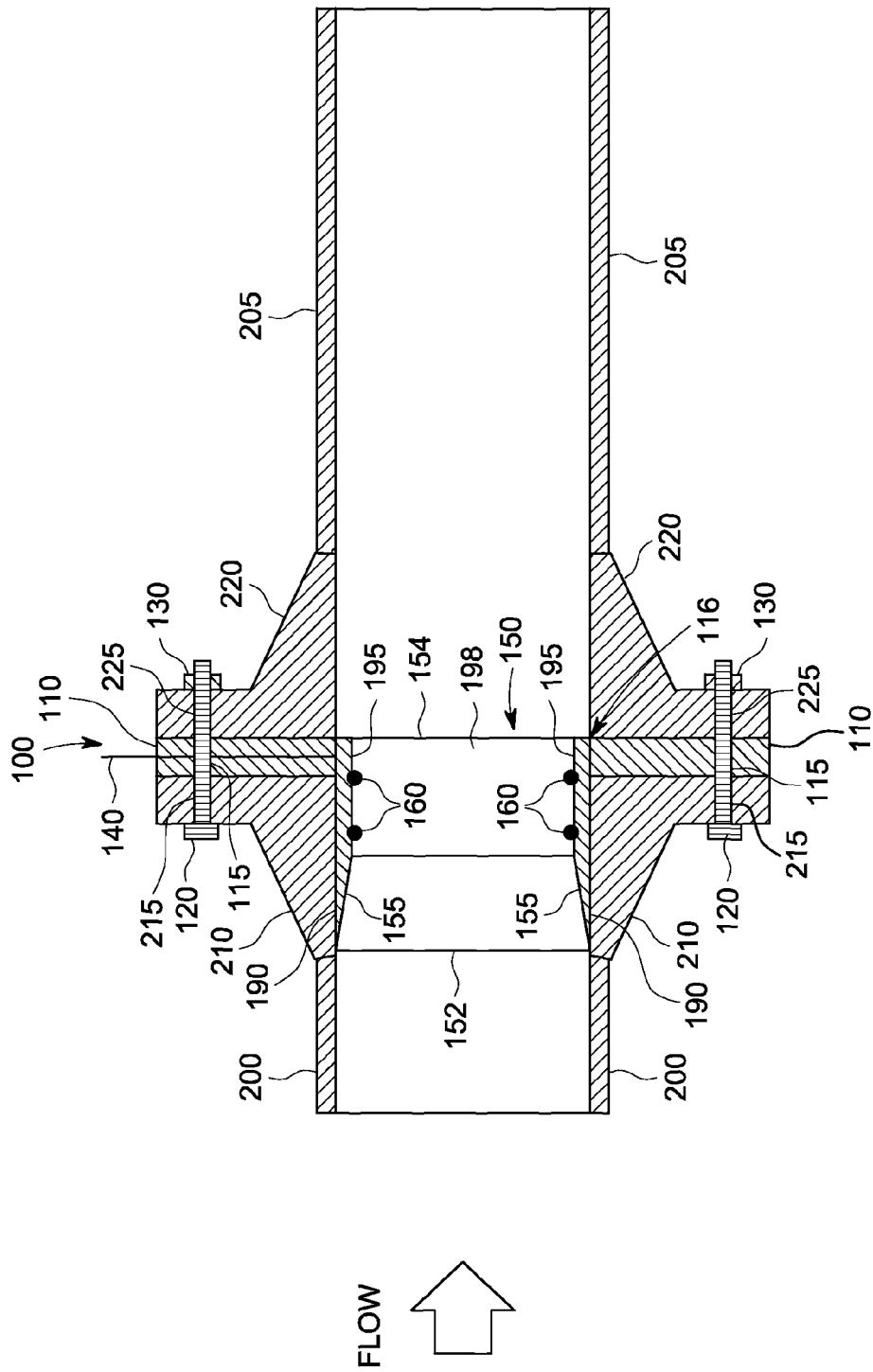
FIG. 2 is an exemplary cross-sectional side view of a multiphase insert meter within a pipe in one embodiment of the invention.

FIG. 2 shows an exemplary cross-sectional side view of a multiphase insert meter 100 within a pipe in one embodiment. The pipe can be, for example, any type of hollow conduit. The inner wall 195 forms a chamber 198 that is open on both ends, through which the flow passes. The diameter of chamber 198 can be selected to suit any given design characteristic while minimizing area constriction of the pipe. In one embodiment, ring 150 fully encircles the inner wall of the pipe within which it is placed, while in other embodiments, ring 150 may only encircle a portion or several portions of the inner wall of the pipe. Ring 150 can be made of, for example, stainless steel, inconel, other exotic metals, ceramic, or plastic. The material used can be chosen based on various considerations, including its resistance to corrosion and its electrical insulative properties.

With reference to FIG. 2, the point on the ring 150 that extends the farthest into the oncoming flow can be the forward end 152. A rearward end 154 of multiphase insert meter 100 can be the point on the ring 150 that extends the farthest into the direction of the flow. A forward bevel 155 can be located proximate the forward end 152 such that the inner wall 195 forms a sloped surface that leads from the forward end 152 inwardly towards the center of the ring 150 in the direction of the flow, reducing the diameter of chamber 198 within the ring 150. Depending on the chosen thickness of the ring 150, the diameter of the chamber 198 through which the flow travels can be larger or smaller. Additionally, the shape of the forward bevel 155, and more generally the overall shape and contour of the inner wall 195, can be chosen to selectively modify the properties and characteristics of the flow so as to achieve a desired result, for example, accentuating or minimizing instabilities in the flow in order to measure them.

Figure 3:
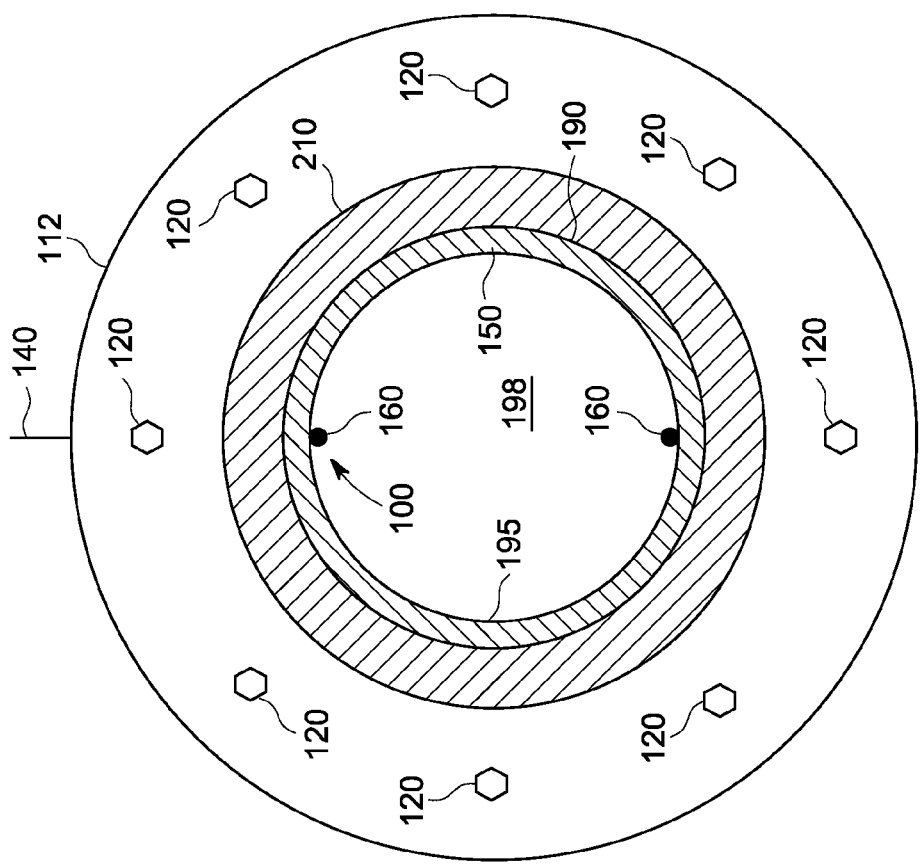
FIG. 3 is an exemplary cross-sectional view of a flow facing end of a multiphase insert meter within a pipe in one embodiment of the invention.

Fixably attached to the outer wall 190 of ring 150 is the meter flange 110. Meter flange 110 can be made of can be made of, for example, stainless steel, inconel, other exotic metals, ceramic, or plastic, and can form a disk-shaped structure with a central passage 116 through which ring 150 can pass. The material used can be chosen based on various considerations, including its resistance to corrosion and its electrical insulative properties. In one embodiment, ring 150 is fixably attached to meter flange 110 by physical means, for example fasteners or welding. In other embodiments, the ring 150 and meter flange 110 can be a unitary structure fabricated from a single piece of material. FIG. 3 is an exemplary cross-sectional view of a flow facing end of a multiphase insert meter 100 within a pipe in one embodiment. As shown in FIGS. 2 and 3; meter flange 110 extends outwardly from ring 150 in a radial direction substantially perpendicular to the outer wall 190.

Meter flange 110 provides support to the multiphase insert meter 100 and facilitates installation of the device within a pipeline. The thickness of the meter flange 110 can be chosen to suit particular design needs and strength requirements. Meter flange 110 has a planar forward flange surface 112 from which the ring 150 extends, and a planar rearward flange surface 118. In one embodiment, ring 150 can be attached to meter flange 110 within the central passage 116. In other embodiments, ring 150 can be attached to meter flange 110 on the forward flange surface 112, the rearward flange surface 118, or both. In one embodiment, meter flanged 110 can contain a number of bolt channels 115 extending around the meter flange 110. Each bolt channel can be a hollow passageway extending through the meter flange 110 and running substantially parallel to the ring 150.

With reference to FIG. 2, multiphase insert meter 100 can be installed between two sections of pipe, a forward pipe 200 that can carry material to the multiphase insert meter 100, and a rearward pipe 205 that can carry material away from the multiphase insert meter 100. The end of the forward pipe 200 leading to the multiphase insert meter 100 is fitted with a forward pipe flange 210. Forward pipe flange 210 can have a hollow internal cavity of the same shape and diameter as that of forward pipe 200 through which the flow can pass, with the end of the forward pipe flange 210 facing the multiphase insert meter 100 forming a planar surface that extends substantially perpendicular to the forward pipe 200. The end of the rearward pipe 205 leading away from the multiphase insert meter 100 is fitted with a rearward pipe flange 220. Rearward pipe flange 220 has a hollow internal cavity of the same shape and diameter as that of the rearward pipe 205 through which the flow can pass, with the end of rearward pipe flange 220 facing the multiphase insert meter 100 forming a planar surface that extends substantially perpendicular to the rearward pipe 205. Together, forward pipe flange 210 and rearward pipe flange 220 provide opposing planar surfaces that facilitate the joining of the two pipe sections. In one embodiment, bolt channels 215 and 225 can extend through forward pipe flange 210 and rearward pipe flange 220, respectively, such that together bolt channels 115, 215 and 225 created a contiguous, hollow passageway through the forward pipe flange 210, meter flange 110 and rearward pipe flange 220 through which bolts 120 can pass.

In new installations forward pipe flange 210 and rearward pipe flange 220 can be manufactured as a contiguous, unitary part of the forward pipe 200 and rearward pipe 205, respectively. In retrofit applications in which the multiphase insert meter is installed within an existing pipe network, the forward pipe flange 210 and rearward pipe flange 220 can be fixably attached to the forward pipe 200 and rearward pipe 205, respectively, by a number of means, including, for example, clamps or welding. The flat, disc shaped meter flange 110 is sized to interface with the planar surfaces of both the forward pipe flange 210 and rearward pipe flange 220 such that forward flange surface 112 of the meter flange 110 is pressed against the flat planar surface of the forward pipe flange 210, and the rearward flange surface 118 is pressed against the flat planar surface of the rearward pipe flange, such that ring 150 can be securely installed between forward pipe 200 and rearward pipe 205. In one embodiment, corresponding bolt channels 115 on the forward pipe flange 210, meter flange 110 and rearward pipe flange 220 can allow for the passage of bolts 120 through the forward pipe flange 210, meter flange 110 and rearward pipe flange 220, where it is secured with a nut 130 on the opposite end to ensure a tight, leak-proof seal between the three components. Gaskets can be placed between the forward pipe flange 210, the meter flange 110 and the rearward pipe flange 220 to ensure a sealed connection. Once installed, the meter flange 110 provides a strong, rigid support structure for the ring 150 to securely hold it in place when positioned within the flow. In other embodiments, the forward pipe flange 210, meter flange 110 and rearward pipe flange 220 can be secured together by other mechanical means, including, for example, clamps. In still further embodiments, the multiphase insert meter 100 can be integrally formed with one or both of the forward pipe flange 210 or rearward pipe flange 220.

Located on the ring 150 can be two or more electrical impedance spectroscopy (EIS) sensors 160, which can allow the multiphase flow meter to perform multiphase flow measurements that not only determine the flow rate, but the states of matter comprising that flow. EIS sensors 160 can be placed on the inner wall 195 of ring 150 such that the EIS sensors 160 have a substantially equidistant spacing around the circumference of the ring 150. In other embodiments, the EIS sensors can be spaced apart in only a portion of the inner wall 195.

Installation of the multiphase insert meter 100 using a single meter flange 110 allows for simple field maintenance and replacement of the meter if necessary. As shown in FIG. 3, wires 140 can extend from the EIS sensors 160 through the meter flange 110 through channels located within the meter flange 110 and out of the multiphase insert meter 100 where they can be integrated into other information processing and control systems. In one embodiment, the channels can be sealed using glass to metal seals. In other embodiments, the channels can be sealed through some other sealing mechanism. In other embodiments, the wires can be inductively coupled to outside wires and processing systems.

Multiphase insert meter 100 does not require an extensive length of straight pipe run, thereby facilitating easy retrofit of the meter into existing industrial systems. The multiphase insert meter 100 can therefore be easily integrated with existing measurement equipment to provide redundant or supplemental measurements, such as being installed after or before an existing in-line ultrasonic meter, coriolis meter, or clamp-on flowmeter. For example, multiphase insert meter 100 can be installed before a coriolis meter, which provides highly accurate mass measurements of a flow, to both determine the content and phases of matter that comprise that flow.

Figure 4:
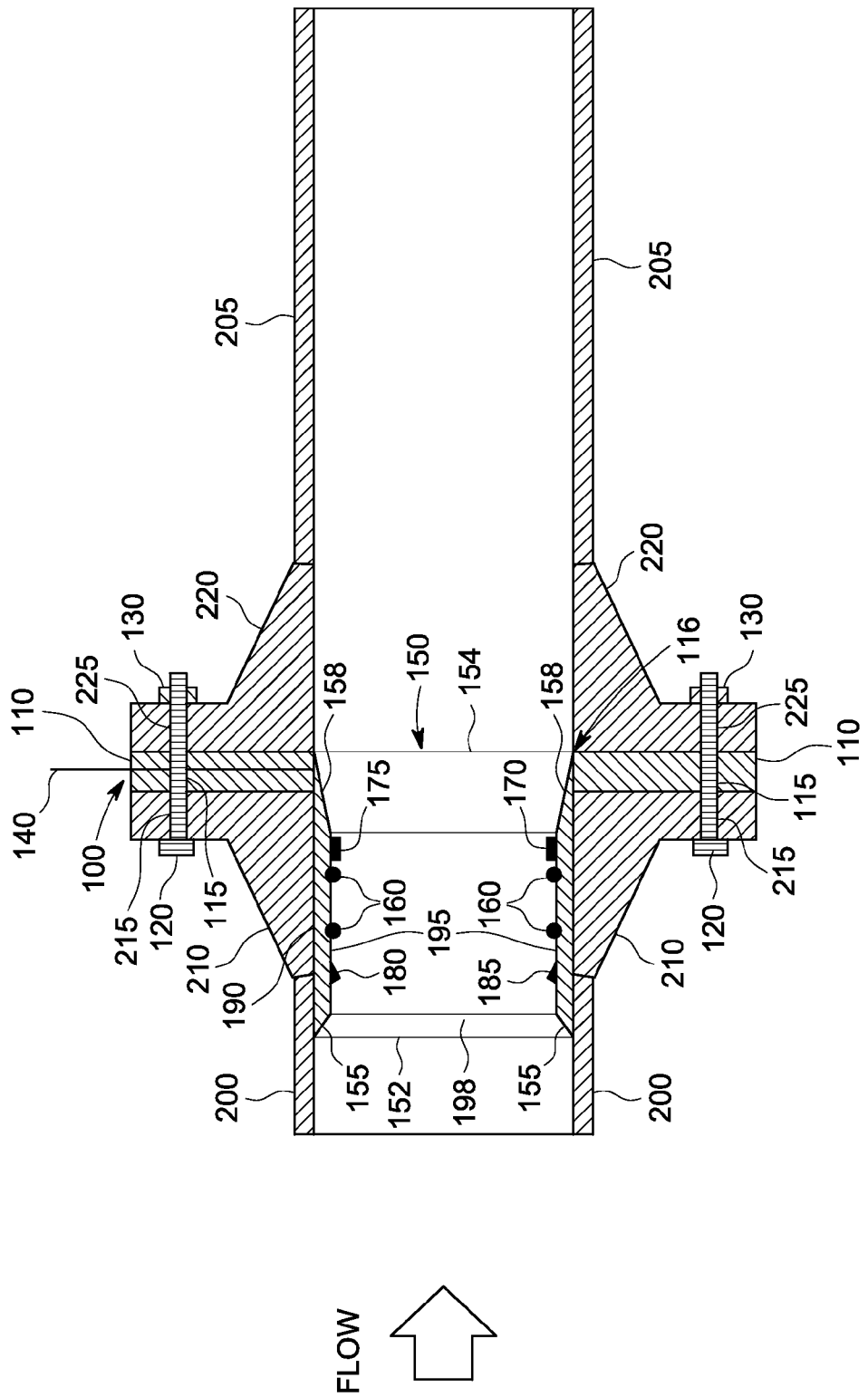
FIG. 4 is an exemplary cross-sectional side view of a multiphase insert meter having multiple types of sensors in one embodiment of the invention.

FIG. 4 is an exemplary cross-sectional side view of a multiphase insert meter 100 having multiple types of sensors in one embodiment. In this embodiment, in addition to EIS sensors, other measuring devices can be located on ring 150. For example, as shown in FIG. 4, an ultrasonic transmitter 170 can be located on the ring 150, along with a corresponding ultrasonic receiver 175 in order to obtain ultrasonic transit time measurements from which the flow rate can be determined. In other embodiments, an ultrasonic transducer can be located on ring 150 instead of an individual transmitter or receiver. Ultrasonic components can be arranged in order to directly measure ultrasonic pulses from corresponding ultrasonic components, or to measure reflected pulses from within the ring 150. Other instrumentation located along the ring 150 can include one or more pressure sensors 180 that measure pressure or differential pressure, and thermal sensors 185. In addition, one or more torsional densitometers, sand detectors, and/or speed of sound sensors can be located on the ring 150.

Placement of sensors on ring 150 around the interior circumference of the pipe through which the flow is being measured minimizes flow restriction by keeping the majority of the pipe open and free from obstructions. This also minimizes particle buildup on the meter, thereby lowering maintenance costs and enhancing operational performance and system longevity, as well as reducing the likelihood that components will separate and be carried along with the flow to downstream components.

Figure 5:
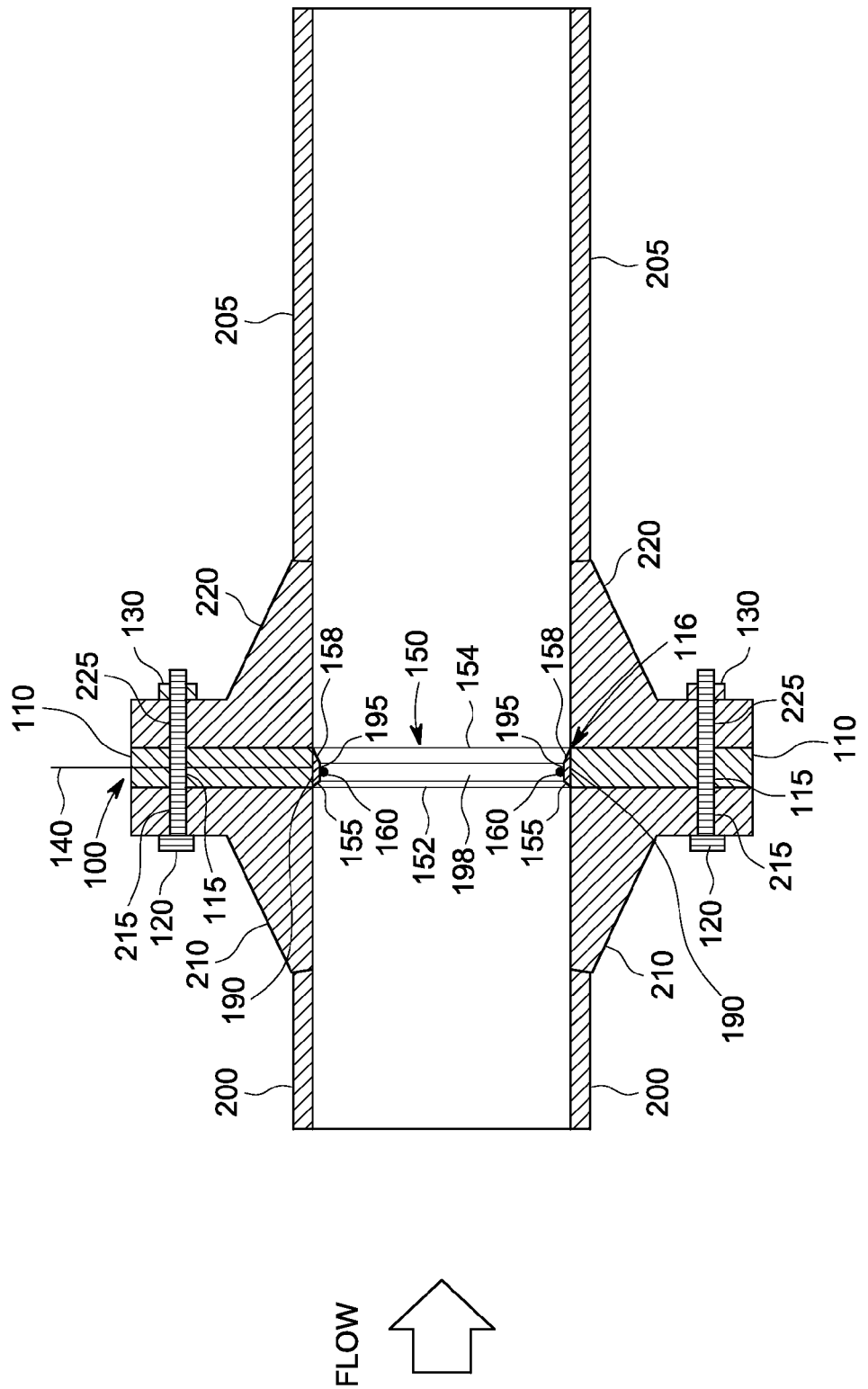
FIG. 5 is an exemplary cross-sectional side view of a compact multiphase insert meter in one embodiment of the invention.

Also as shown in FIG. 4, ring 150 can also have a rearward bevel 158 to facilitate the smooth transition of the flow from the multiphase insert meter 100 back to the full diameter of rearward pipe 205. Other contours and variations on the inner wall 195 of multiphase insert meter 100 can create or minimize instabilities within the flow to achieve desired flow characteristics for measurement. For example, inner wall 195 can form at least one venturi within the multiphase insert meter 100 in which a portion of the inner wall 195 tapers inwardly to narrow the cross-sectional area through which the flow can pass, followed by a portion of restricted constant area that leads to a portion in which the inner wall 195 expands outwardly toward the pipe. In other embodiments, the forward end 152 of ring 150 can extend into the forward pipe 200 and/or the rearward end 154 can extend into rearward pipe 205. FIG. 5 shows an exemplary cross-sectional side view of a compact multiphase insert meter having a width equal to that of the meter flange in one embodiment in which neither the forward end 152 of ring 150 nor the rearward'end 154 of ring 150 extends beyond the width of the meter flange 110.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for measuring the characteristics of a flow within a pipe comprising:
   a meter flange having a forward flange surface and a rearward flange surface;
   a central passage extending through said meter flange from said forward flange surface to said rearward flange surface;
   a ring having an inner wall and an outer wall, said outer wall being fixably attached to said meter flange and having an outside diameter substantially equivalent to an inner diameter of the pipe along an entire length of the ring such that the ring may be inserted into a flange of the pipe, and said length of the ring being substantially perpendicular to said forward flange surface; and
   a sensor located on said inner wall for measuring said characteristics of said flow.

2. The device of claim 1, wherein said sensor is an electrical impedance spectroscopy sensor.

3. The device of claim 1, wherein said sensor is an ultrasonic sensor.

4. The device of claim 1, wherein said sensor is a pressure sensor.

5. The device of claim 1, wherein said sensor is a thermal sensor.

6. The device of claim 1, wherein said sensor is a torsional densitometer.

7. The device of claim 1, wherein said sensor is a speed of sound sensor.

8. The device of claim 1, wherein said sensor is a sand detector.

9. The device of claim 1, wherein said ring further comprises a forward bevel located proximate a forward end of said ring where said flow enters said device.

10. The device of claim 1, wherein said ring further comprises a rearward bevel located proximate a rearward end of said ring where said flow exits said device.

11. The device of claim 1, wherein said inner wall forms a venturi.

12. The device of claim 1, wherein said meter flange and said ring are made of a single piece of contiguous material.

13. The device of claim 1, wherein said ring encircles a portion of the inner diameter of said pipe.

14. The device of claim 1, wherein said ring is located within said central passage and extends beyond said meter flange into said flow.

15. The device of claim 1, further comprising wires encased in a glass to metal seal extending from said sensor to a surface of said meter flange.

16. The device of claim 1, further comprising inductively coupled wires extending from said sensor to a surface of said meter flange.

17. A device for measuring the characteristics of a flow within a pipe comprising:
    a meter flange having a forward flange surface and a rearward flange surface;
    a central passage extending through said meter flange from said forward flange surface to said rearward flange surface;
    a ring having an inner wall and an outer wall, said ring extending within said central passage, said outer wall being fixably attached to said meter flange and said ring having an outside diameter substantially equivalent to an inner diameter of the meter flange along an entire length of the ring, wherein said ring does not extend into said flow beyond said forward flange surface and said rearward flange surface; and
    a sensor located on said inner wall for measuring said characteristics of said flow.

* * * * *